Figure 1:
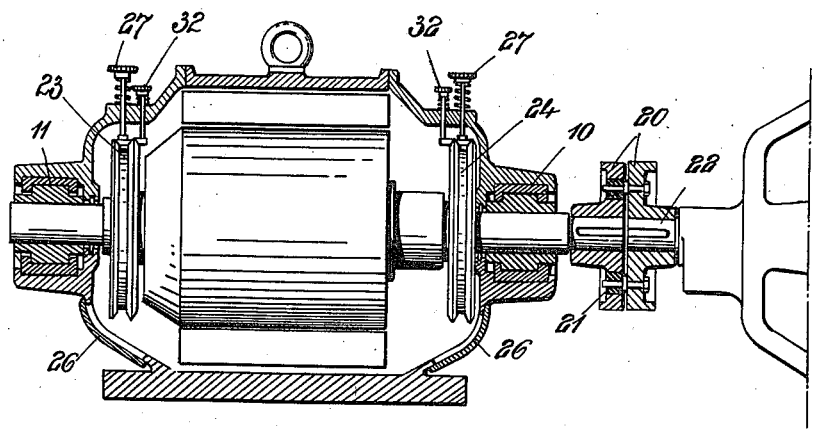

July 8, 1924.

H. HEYMANN

BALANCED MACHINE

Filed Oct. 4, 1921

1,500,454

Inventor:
Hans Heymann

Patented July 8, 1924.

1,500,454

UNITED STATES PATENT OFFICE.

HANS HEYMANN, OF DARMSTADT, GERMANY.

BALANCED MACHINE.

Application filed October 4, 1921. Serial No. 505,410.

*To all whom it may concern:*

Be it known that I, HANS HEYMANN, resident at Darmstadt, Germany, have invented certain new and useful Improvements in Balanced Machines, of which the following is a specification.

My invention refers to the balancing of the revoluble parts of machinery of all sorts, such as rotary power engines, dynamos, conveying and hoisting machinery, machine tools and so on, and more particularly these revoluble parts themselves and its primary object is to provide means on such parts or machines which allow of the revoluble part in question being balanced without dismantling the machine and preferably while the machine is running. Many machines are in use whose rotor has not been balanced and which therefore gives rise to troublesome stoppages of service. But it also happens that bodies which were balanced before being put to use become unbalanced during service through injuries or repairs. In all such cases it has hitherto hardly been possible to carry out balancing operations while the machine is in use or without a long stoppage of the same. The success of experiments or attempts in this direction was always left to chance, so that cases in which the work had to be given up after weeks of fruitless labor are not at all rare.

According as the vibrations of the rotating part have their origin in a single force, a couple of forces, or forces acting in the direction of intersecting lines, it is necessary to determine, not only the plane in which the disturbing force acts, but also the point on which it acts and its magnitude, i. e. the sense of rotation and the magnitude of the particular moment or cross forces in question. The procedure adopted hitherto for ascertaining these values consisted in observing the critical speed of revolution of the shaft, i. e. the speed at which the vibrations due to the unbalancing forces are greatest. In the case of rotating bodies which are journalled in their housings in the manner required for ordinary service this procedure involves grave risks because the natural critical speed of revolution is comparatively high so that ruptures are liable to occur. The expedient of loosening the bolts of the bearings for the purpose of augmenting the vibrations when the critical speed of revolution is reached does not tend to eliminate this danger but will sometimes even tend to increase it.

In order to ascertain the plane of action of the disturbing force or influence the rotary body is generally marked in a known manner. To enable this to be satisfactorily carried out it is necessary that the body be provided with a cylindrical surface, such as a section of shaft or a drum-shaped part, that is as smooth as possible.

The magnitude of the balancing weight was determined hitherto by comparative measurements of the vibrations, this having also been the usual procedure in those methods of determining the plane and the magnitude of the unbalancing force in which two balancing weights arranged in one balance weight plane, and at any desired angle to each other, were gradually altered.

The application of all of these methods in machines which have to be balanced or tested for smoothness of running while they are in use is coupled with the disadvantage that the machine has to be stopped before and after each measuring operation. The balance weights have to be attached to the body to be tested and this body is generally surrounded by a housing so that it is inaccessible. It is therefore necessary after each measuring operation to perform a great deal of work in taking the machine apart and reassembling it; this work, especially in the case of large units, such as steam turbines for example, taking hours or even days to execute. Hence, apart from exceptional cases, it is generally impossible to avoid stoppages of comparatively long duration.

These drawbacks are all removed by the present invention through each rotating part of a machine being provided with supporting surfaces adapted for receiving devices by means of which the revolving part can be balanced while the machine is in use. In addition to this the bearings of the rotating part in the machine casing must be arranged in such a manner that the said part is enabled to oscillate about a plurality of points in succession, preferably about the bearings themselves. The method of balancing a body under test by making it act like a pendulum capable of being caused to swing round different points is known, but hitherto it has been the practice to provide special devices built only for this specific purpose and it has not been usual in the art of constructing machines to provide in a machine-casing intended for practical service such bearings as will enable the rotating body journalled in them to carry out oscillating motions whenever it is required to do so. In my copending application for patent of the United States, Serial Number 494,958, filed August 24, 1921, I have disclosed such bearings, each being capable of bodily rocking in a horizontal plane or on the surface of a cone, means being provided for alternately locking one or the other bearing against such movement. To prevent the rotating part from jamming in its bearings and from scraping against its casing and, above all, to artificially reduce the critical speed of revolution and preclude the risk of breakage, the service bearings of the machine will preferably be arranged for the temporary or permanent lodgment of elastic retaining members. In distinction from the known forms of elastic bearings used in centrifugal machines and the like the said elastic retaining members are preferably arranged to be put out of operation when the machine is in use. It is well known that the object of elastic bearings in centrifugal machines is to cause the drum of the machine, when unevenly filled, to automatically assume its natural or free axis of rotation, while the elastic medium which is used in service bearings according to the invention is only made to act occasionally, i. e. whenever it is deemed necessary to balance the rotating part.

If the machine should be connected by a coupling to other machine parts, the kind of coupling preferably employed in accordance with the invention will be one of a known type which yields sufficiently to permit of the rotary machine part oscillating as required during the operation of balancing it.

The members required for controlling or influencing the devices by which the rotating part can be balanced while it is in use are preferably built into the machine casing, so that the balancing device can be controlled from outside the machine without taking it apart or altering it in any manner whatever. To prevent the balancing device from being used by unauthorized persons the members by which the balancing devices are controlled are preferably covered by a suitable hood or the like.

A constructional example of the invention is diagrammatically shown in the drawing in which—

Figure 3:
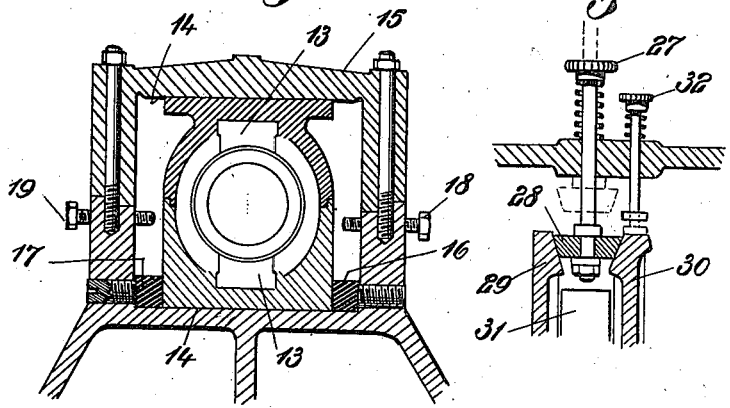
Figure 2:
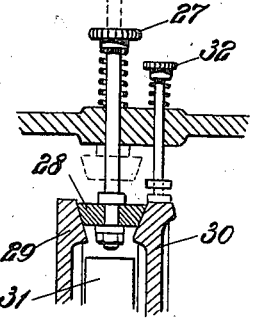

Fig. 1 is a longitudinal section through the housing of a motor whose armature or rotor is to be balanced, Fig. 2 shows the balancing device mounted on the rotor, and Fig. 3 illustrates a transverse section of a preferred type of bearing according to the invention.

The machine shown in Fig. 1 is designed on the assumption that the known method of approximation, in which the middle lines passing through the bearings at right angles to the axis of rotation of the rotor are made to act alternately as axes of oscillation, is to be employed in carrying out the balancing operation. To this end the journals 10 and 11 and the machine casing are constructed in such a manner as to permit of the rotor 12 of the machine oscillating to a certain extent around the pins 13 of each bearing (Fig. 3). From Fig. 3 it will be obvious that, in addition to this, each bearing is capable of sliding laterally a certain distance in the guides 14 of the bearing supports, like the bearings of balancing machines. Elastic members such as rubber stops 16, 17 may be lodged permanently in the bearing support, or they may be inserted temporarily whenever a balancing operation is to be carried out. The elastic members may be prevented from acting by rigidly fixing the bearing by means of screws 18, 19 or the like, and these screws may also be made to serve as stops for limiting the motion of the bearings during the balancing operation.

The coupling 20 is constructed in a known manner with elastic members 21 which permit of movements of the rotor 12 relatively to the machine part 22 without the shaft being bent.

The rotor 12, which is intended to be balanced, or whose unbalancing forces are to be ascertained while the machine is in use, has room provided on it for two balancing devices 23 and 24. These devices may either be permanently fixed on the rotor or they may be mounted in the places provided for them on the rotor before the balancing operation is commenced. The balancing devices are preferably subdivided or so arranged that they may easily be fixed to the rotor 12. After the balancing operation has been carried out while the machine is in use, the balancing devices may be permanently left upon the rotor. This offers the advantage that the equilibrium of the machine can be checked at any time during its operation. Besides it will then not be necessary to deduce by calculation from the values found the balancing masses required at the parts of the rotor that are deemed most suitable for their attachment. Openings 25, 26 with covers may be provided for facilitating the mounting and removing of the balancing devices.

Fig. 2 shows a constructional form of the contrivance adapted for controlling the balancing device and manipulated at the outside of the machine housing. If these contrivances are to remain permanently on the machine it will be preferable to cover them with suitable caps to prevent their being worked by unauthorized persons.

In the case of the constructional example illustrated the operation of balancing the rotor while the machine is in use takes place in following manner:

One of the two bearings say 11 is permitted to swing laterally by its fixing bolts 18, 19 being loosened. The said lateral swinging movement will however be influenced by the elastic buffers 16, 17. The rotor 12 is thus enabled to oscillate to a certain extent round the pivots 13 of the bearing 10, the machine housing being so constructed as to render this limited oscillatory movement possible. The machine is now speeded up until a speed exceeding that of the critical speed of revolution is reached, when the difference of phase between the unbalancing mass of the machine and the oscillation amounts to 180°. Then the press button 27 of the balancing device 23 (Fig. 2) is depressed for a few seconds so as to cause the conical wheel 28 controlled by the button 27 to shift the two disks 29, 30 of the balancing device somewhat further apart. Hereby the particular part of the balancing device that carries the balancing mass—which part may consist of a disk 31 located between the two disks 29, 30—is released so that the balancing mass goes automatically into the plane of the unbalancing force but into a position in which it is displaced relatively to the unbalancing mass by 180°.

As soon as it may be assumed that the balancing mass has shifted into the said position the press button 27 is released so that the conical prizing wheel is disengaged from the disks 29, 30 and the balancing mass is held immovably fixed in the plane of the unbalancing force. The speed of revolution is then gradually lowered so as to cause the rotor to go as slowly as possible through the region of resonance. At the same time the press button 32 is pushed inward. This affects the disk 30 and this disk then gives rise to a radial displacement of the balancing mass which is held fixed in the plane of the unbalancing force. The press button 32 is worked a number of times if necessary until the force exerted by the balancing mass is such that it eliminates the vibrations of the rotor 12 to the greatest possible extent. This state of equilibrium can be ascertained by feeling the housing of the machine with the hand.

Without stopping the machine the bearing 11 is now converted into an axis of oscillation by fastening the securing bolts 18, 19, and the rotor bearing 10 is converted into a sliding bearing by its securing bolts being loosened. The balancing operation is then proceeded with in the manner already described but with the aid of the balancing device 24. If, after the bearings have again been converted—preferably without stopping the machine—it is found that the unbalancing force which was not neutralized in the second balancing operation is still impermissibly great, the balancing operation is continued as in the known method of approximation with the aid of the balancing device 23. The process of balancing the rotor is continued in this manner without stopping the machine until the supplemental forces of the balancing devices 23 and 24 counterbalance the unbalancing forces of the rotor.

It may happen in practice that the balancing masses fitted into the devices 23 and 24 are not sufficiently large to produce the necessary centrifugal force even when they have been shifted into their outmost radial positions. In such cases a stoppage of the machine for the purpose of inserting suitable balance weights into the devices 23 and 24, through the openings preferably provided herefor in the machine housing, will of course be unavoidable.

The term "machine" as used in the claims appended to and forming part of this specification is meant to comprise all kinds of machinery comprising rotary members, with the only exception of balancing machines.

I wish it to be understood that I do not desire to be limited to the exact details of construction shown and described, for obvious modifications will occur to a person skilled in the art.

I claim:

1. Machine comprising in combination, a rotor, a journal connected with said rotor and bearings supporting said journal with a clearance between said bearings and said rotor adapted for the arrangement of balancing means, said bearings being capable of bodily oscillating substantially in a plane transversely to the axis of said rotor and separate means for locking each bearing in position.

2. Machine comprising in combination, a rotor, a journal connected with said rotor and bearings supporting said journal with a clearance between said bearings and said rotor adapted for the arrangement of balancing means, said bearings being capable of bodily oscillating substantially in a plane transversely to the axis of said rotor and about an axis extending vertically with regard to this plane and separate means for locking each bearing against rocking motion in a plane.

3. Machine comprising in combination, a rotor, a journal connected with said rotor and bearings supporting said journal with a clearance between said bearings and said rotor adapted for the arrangement of balancing means, said bearings being capable of bodily oscillating substantially in a plane transversely to the axis of said rotor, separate means for locking each bearing in position and a housing around said rotor with a clearance between said rotor and said housing in the plane of oscillation.

4. Machine comprising in combination, a rotor, a journal connected with said rotor and bearings supporting said journal with a clearance between said bearings and said rotor adapted for the arrangement of balancing means, said bearings being capable of bodily oscillating substantially in a plane transversely to the axis of said rotor, separate means for locking each bearing in position, a second rotor in alignment with said rotor first-mentioned and an elastic coupling between and operatively connecting said rotors.

5. Machine comprising in combination, a rotor, a journal connected with said rotor and bearings supporting said journal with a clearance between said bearings and said rotor adapted for the arrrangement of balancing means, said bearings being capable of bodily oscillating substantially in a plane transversely to the axis of said rotor, separate means for locking each bearing in position and elastic members capable of acting on said bearings so as to elastically secure them in place.

6. Machine comprising in combination, a rotor, a journal connected with said rotor and bearings supporting said journal with a clearance between said bearings and said rotor adapted for the arrangement of balancing means, bearing supports surrounding said bearings and capable of bodily motion in a plane transversely to the axis of said rotor together with said bearings and separate means for locking each support in position.

7. Machine comprising in combination, a rotor, a journal connected with said rotor and bearings supporting said journal with a clearance between said bearings and said rotor adapted for the arrangement of balancing means, bearing supports surrounding said bearings and capable of bodily motion in a plane together with said bearings, means inserted between said bearings and said supports for turning said bearings in said supports about an axis at right angles to said plane and separate means for locking each support in position.

8. Machine comprising in combination, a rotor, a journal connected with said rotor and bearings supporting said journal with a clearance between said bearings and said rotor adapted for the arrangement of balancing means, bearing supports surrounding said bearings and capable of bodily motion in a plane together with said bearings, elastic members capable of acting on said supports so as to elastically secure them in place and separate means for locking each support in position.

9. Machine comprising in combination, a rotor, a journal connected with said rotor and bearings supporting said journal with a clearance between said bearings and said rotor adapted for the arrangement of balancing means, bearing supports surrounding said bearings and capable of bodily motion in a plane together with said bearings, means inserted between said bearings and said supports for turning said bearings in said supports about an axis at right angles to said plane, elastic members capable of acting on said supports so as to elastically secure them in place and separate means for locking each support in position.

10. Machine comprising in combination, a rotor, a journal connected with said rotor and bearings supporting said journal with a clearance between said bearings and said rotor adapted for the arrangement of balancing means, bearing supports surrounding said bearings and capable of bodily motion in a plane together with said bearings and stops for limiting such motion.

11. Machine comprising in combination, a rotor, a journal connected with said rotor and bearings supporting said journal with a clearance between said bearings and said rotor adapted for the arrangement of balancing means, bearing supports surrounding said bearings and capable of bodily motion in a plane together with said bearings and adjustable stops for limiting such motion.

12. Machine comprising in combination, a rotor, a journal connected with said rotor and bearings supporting said journal with a clearance between said bearings and said rotor adapted for the arrangement of balancing means, said bearings being capable of bodily oscillating substantially in a plane, separate means for locking each bearing in position and controlling members permanently secured in operative position near said clearance for cooperation with the balancing members.

13. Machine comprising in combination, a rotor, a journal connected with said rotor and bearings supporting said journal with a clearance between said bearings and said rotor adapted for the arrangement of balancing means, said bearings being capable of bodily oscillating substantially in a plane, separate means for locking each bearing in position, a housing around said rotor with a clearance between said rotor and said housing in the plane of oscillation and controlling members permanently associated with said housing for cooperation with the balancing means.

14. Machine comprising in combination, a rotor, a journal connected with said rotor and bearings supporting said journal with a clearance between said bearings and said rotor adapted for the arrangement of balancing means, said bearings being capable of bodily oscillating substantially in a plane, separate means for locking each bearing in position, a housing around said rotor with a clearance between said rotor and said housing in the plane of oscillation, controlling members permanently associated with said housing for cooperation with the balancing means and a cover preventing access to said controlling members.

In testimony whereof I have signed this specification.

HANS HEYMANN.